(12) United States Patent
Siebenmorgen et al.

(10) Patent No.: US 12,241,837 B2
(45) Date of Patent: Mar. 4, 2025

(54) APPARATUS FOR STRUCTURED ILLUMINATION MICROSCOPY, METHOD FOR ILLUMINATING A SAMPLE AND METHOD OF STRUCTURED ILLUMINATION MICROSCOPY

(71) Applicant: Carl Zeiss Microscopy GmbH, Jena (DE)

(72) Inventors: Joerg Siebenmorgen, Jena (DE); Ingo Kleppe, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 121 days.

(21) Appl. No.: 18/164,996

(22) Filed: Feb. 6, 2023

(65) Prior Publication Data

US 2023/0266246 A1    Aug. 24, 2023

(30) Foreign Application Priority Data

Feb. 9, 2022  (DE) ................... 10 2022 103 051.2

(51) Int. Cl.
*G01N 21/64*      (2006.01)
*G02B 21/06*      (2006.01)
(Continued)

(52) U.S. Cl.
CPC ......... *G01N 21/6458* (2013.01); *G02B 21/06* (2013.01); *G02B 21/16* (2013.01);
(Continued)

(58) Field of Classification Search
CPC ......... G01N 21/6458; G01N 2201/061; G01N 21/00; G01N 21/01; G01N 2021/0106;
(Continued)

(56) References Cited

U.S. PATENT DOCUMENTS 10,222,599 B2    3/2019  Ouchi et al.

FOREIGN PATENT DOCUMENTS

DE   10 2013 004 963 A1    9/2014
WO   WO-2009141107 A1 *   11/2009 ............. G02B 21/06

OTHER PUBLICATIONS

Olga Gliko, et al., Fast two-dimensional standing-wave total-internal reflection fluorescence microscopy using acousto-optic deflectors, Optics Letters (Mar. 15, 2009) vol. 34, No. 6, p. 836-838.

(Continued)

*Primary Examiner* — Don K Wong
(74) *Attorney, Agent, or Firm* — DUANE MORRIS LLP

(57) ABSTRACT

An apparatus and method for structured illumination microscopy, having an illumination beam path for irradiating a sample with excitation light with a two-dimensional illumination pattern at angles greater than the angle for total internal reflection. The illumination beam path has an illumination objective used to irradiate the sample. A first separation device for separating the excitation light in a first linear coordinate direction in a pupil plane and a displacement device for laterally displacing the illumination pattern in a sample plane, having a detection beam path containing at least one microscope objective for guiding emission light to a camera. The emission light is emitted by the sample as a consequence of the irradiation by the excitation light. A camera for recording images of the sample, has a control unit for calculating microscopic images of the sample using partial images of the sample recorded for different positions of the illumination pattern in the sample plane. The apparatus has an adjustable second separation device for variably separating the excitation light in a second linear coordinate direction which is independent of the first linear coordinate direction, this variable separation being independent of the (Continued)

separation in the first linear coordinate direction in the pupil plane.

32 Claims, 9 Drawing Sheets

(51) Int. Cl.
*G02B 21/16* (2006.01)
*G02B 21/36* (2006.01)

(52) U.S. Cl.
CPC ... *G02B 21/361* (2013.01); *G01N 2021/6463* (2013.01); *G01N 2201/061* (2013.01)

(58) Field of Classification Search
CPC ........ G01N 21/17; G02B 21/16; G02B 21/06; G02B 21/361; G02B 6/00; G02B 6/0001; G02B 2006/0098; G02B 6/255; G02B 17/00; G02B 17/002; G02B 21/00; G02B 21/0008; G02B 21/0016; G02B 21/002
See application file for complete search history.

(56) References Cited

OTHER PUBLICATIONS

German Search Report dated Sep. 14, 2022 issued in German Application No. 10 2022 103 051.2.

* cited by examiner

APPARATUS FOR STRUCTURED ILLUMINATION MICROSCOPY, METHOD FOR ILLUMINATING A SAMPLE AND METHOD OF STRUCTURED ILLUMINATION MICROSCOPY

RELATED APPLICATION

The present application is a U.S. National Stage application of German Application No. DE/10 2022 103 051.2 filed on Feb. 9, 2022, the contents of which are herein incorporated by reference in their entirety.

FIELD OF THE INVENTION

The invention relates to an apparatus for structured illumination microscopy according to the scope of the annexed claims, and to a method for illuminating a sample for structured illumination microscopy. Moreover, the invention relates to a method of structured illumination microscopy.

BACKGROUND OF THE INVENTION

A generic apparatus for structured illumination microscopy is described in U.S. Pat. No. 10,222,599B2, for example, and initially has an illumination beam path for irradiating a sample with excitation light with a two-dimensional illumination pattern at angles greater than the angle for total internal reflection. The illumination beam path contains at least one illumination objective used to irradiate the sample, a first separation device for separating the excitation light in a first linear coordinate direction in a pupil plane and a displacement device for laterally displacing the illumination pattern in a sample plane. Then, a detection beam path is present, containing at least one microscope objective for guiding emission light to a camera, the said emission light being emitted by the sample as a consequence of the irradiation by the excitation light. Finally, the generic apparatus contains the camera for recording images of the sample and a control unit for calculating microscopic images of the sample using partial images of the sample recorded for different positions of the illumination pattern in the sample plane.

The following steps are carried out in a generic method for illuminating a sample for structured illumination microscopy: a sample is irradiated by excitation light with a two-dimensional illumination pattern via an illumination objective using an illumination beam path at angles greater than the angle for total internal reflection, the excitation light being radiated into separate illumination points in a pupil plane of the illumination beam path in order to provide the illumination pattern and the excitation light being separated in a first linear coordinate direction in the pupil plane of the illumination beam path.

A method for illuminating a sample for structured illumination microscopy having these features is likewise disclosed in U.S. Pat. No. 10,222,599B2.

Structured illumination microscopy (SIM) allows the optical resolution of a microscope to be improved in all three spatial dimensions. A sample, in particular a fluorescent sample, is illuminated using an illumination pattern, and consequently illuminated by spatially structured light, and the illumination pattern is phase-shifted multiple times relative to the sample until all illumination gaps have been filled. A high-resolution image is calculated from the images obtained thus, the calculation process also being referred to as reconstructing.

Using visible illumination light, it is possible for example to achieve a lateral resolution of approx. 105 nm and an axial resolution of approx. 300 nm. To further increase the axial resolution, SIM can be combined with TIRF microscopy (TIRF=Total Internal Reflexion Fluorescence). In the case of TIRF microscopy, the sample is only excited evanescently, that is to say in exponentially decaying fashion, in a layer thickness of approx. 100 nm at the coverslip/sample transition using excitation light. The excitation light coming from the coverslip is incident on the sample very obliquely at an angle greater than the total internal reflection angle. The vast majority of the illumination light is reflected back in the direction of the objective at the coverslip/sample transition. To obtain the very oblique illumination required for total internal reflection, the illumination light must be positioned very far to the outside in the objective pupil. Using the alpha-Plan-Apo 63x/1.46 Oil objective as an example in this respect:

Objective pupil diameter: 7.62 mm
Objective pupil TIRF radius range: 3.47 mm to 3.81 mm
TIRF angle range in the intermediate image plane upstream of the tube lens: 1.11° to 1.33°
TIRF angle range in the object space upstream of the objective: 61.18° to 74.11°

The numbers show that the TIRF illumination spots in the objective pupil must be flexibly adjustable. If SIM and TIRF are combined, at least two spots are required in the objective pupil in order to obtain one-dimensional structuring. For two-dimensional structuring (for example for Lattice-SIM in the "Elyra 7" product by Carl Zeiss), at least three spots are required in the objective pupil, the three spots not being collinear and each having to satisfy the TIRF condition and then jointly generating a two-dimensional illumination pattern (2-D illumination pattern) in the sample. There are various options for positioning the illumination spots, which are also referred to as TIRF spots, in the objective pupil: e.g., by generating an inclination angle of the illumination beam near the intermediate image by means of mirrors or by a direct parallel displacement of the illumination spot in the pupil or in the vicinity of a pupil using plane-parallel plates (GE Healthcare).

SUMMARY OF THE INVENTION

Specifying an apparatus and a method for illuminating a sample for structured illumination microscopy, in which the illumination is implemented using a simpler structure in comparison with the prior art, can be considered to be an object of the invention.

This object is achieved by the apparatus having the features of the annexed apparatus claims and the method having the features of the annexed method claims. The method of structured illumination microscopy having the features of the annexed claims relating to a method of structured illumination.

Advantageous exemplary embodiments of the apparatus according to the invention and preferred variants of the methods according to the invention are described below, in particular with reference to the dependent claims and the figures.

According to the invention, the apparatus of the type set forth at the outset is developed in that an adjustable second separation device is present for variably separating the excitation light in a second linear coordinate direction which is independent of the first linear coordinate direction, this variable separation being independent of the separation in the first linear coordinate direction in the pupil plane.

According to the invention, the method of the type set forth at the outset is developed in that, in order to form the illumination points with an illumination angle for total internal reflection, the excitation light is variably separated in a second linear coordinate direction which is independent of the first linear coordinate direction, this variable separation being independent of the separation in the first linear coordinate direction.

In the method of structured illumination microscopy according to the invention, a sample is illuminated in structured fashion according to the method according to the invention using excitation light, emission light emitted by the sample as a consequence of being irradiated by the excitation light is guided to a camera in a detection beam path containing at least one microscope objective, the illumination pattern is being laterally displaced in a sample plane, a respective partial image of the sample is being recorded for different positions of the illumination pattern in the sample plane and a microscopic image of the sample is being calculated from the partial images of the sample.

The apparatus according to the invention is suitable in particular for carrying out the methods according to the invention.

The term "illumination beam path" denotes all optical beam-guiding and beam-modifying components, for example lenses, mirrors, prisms, gratings, filters, stops, beam splitters, by means of which and via which the excitation light is guided from a light source, for example a laser, up to the sample to be examined. The illumination beam path contains at least the first and the second separation device and an illumination objective. The illumination objective may be a microscope objective of a type known per se. The term "angle for total internal reflection" means the angle at which total internal reflection starts. That is to say, light is subject to total internal reflection if it is radiated in at an angle relative to the optical axis that is greater than or equal to the angle for total internal reflection. To obtain the irradiation angles greater than the angle for total internal reflection, use is advantageously made of illumination objectives with a high numerical aperture.

The separation of the excitation light in a pupil plane in essence means a spatial separation. Variably separating the excitation light means that the extent or the size of the separation is variable and can be adjusted.

The first and the second linear coordinate directions each refer to a coordinate direction of a linear Cartesian coordinate system in the three-dimensional spatial domain, which directions extend in a pupil plane, that is to say transverse or perpendicular to an optical axis.

A separation in the second coordinate direction which is independent of the first linear coordinate direction means that a possibly present separation in the first coordinate direction remains unchanged when the separation in the second coordinate direction is implemented.

When the claims refer to the excitation light being separated in a certain coordinate direction in the pupil plane of the illumination beam path or to a separation device being present for separating the excitation light in a specific coordinate direction in the pupil plane, these are features which relate to the position of the separate illumination points in the pupil plane, specifically the separation thereof in specific coordinate directions. These features contain no statements regarding the location in the beam path where the means used to manipulate the illumination points in the pupil plane, that is to say the separation devices, are arranged. Accordingly, the separation devices may, in principle, be arranged at any locations in the beam path upstream of the pupil plane in which the illumination points to be manipulated are situated.

A two-dimensional illumination pattern means an illumination pattern which is structured, in particular periodically structured, in two linear spatial coordinate directions. Typically, use is made of grating-type illumination patterns, which can be implemented for example using four separate illumination spots in the pupil plane, corresponding to a superposition of four plane waves.

The lateral displacement of the illumination pattern in a sample plane brought about using the displacement device refers to the displacement of the illumination pattern in the sample plane in directions transverse or perpendicular to the optical axis. If the optical axis is defined as the direction of the z-axis, the lateral displacement thus means a displacement in the x- and/or y-direction. Typically, the two-dimensional illumination pattern is displaced at approximately 9 or, should light of the zeroth order of diffraction be used as well, 13 different positions in a unit cell of the two-dimensional illumination pattern, that is to say at approx. 3 to 5 different positions in each linear coordinate direction. Respective images referred to as partial images are recorded for different positions of the illumination pattern in the sample plane. A microscopic image of the sample is reconstructed, that is to say calculated, from the totality of the partial images, typically from approximately 9 or 13 images.

Light emitted by the sample to be examined as a consequence of the irradiation by the excitation light is referred to as emission light and reaches the camera via the detection beam path. The term "detection beam path" denotes all beam-guiding and beam-modifying optical components, for example lenses, mirrors, prisms, gratings, filters, stops, beam splitters, by means of which and via which the emission light is guided from the sample to be examined up to the camera. The detection beam path contains at least a microscope objective. The camera is an optical detector having a sensor surface with spatial resolution in two dimensions for recording images of the sample. By way of example, the camera can be an sCMOS camera. The camera can be controlled by the control unit, in particular in a manner adapted to the control of the displacement device.

The term "control unit" denotes all hardware and software components which interact with the components of the microscope according to the invention for the intended functionality of the latter. In particular, the control unit may comprise a computing device, for example a PC, and a camera controller able to read the pixels of the sensor surface and to calculate an image of the sample from the recorded partial images.

The pupil plane of the illumination beam path refers to the back focal plane of the illumination objective and planes optically conjugate thereto.

The term "illumination point" or "illumination spot" denotes a point-like intensity distribution, in particular in a pupil plane, the diameter of which may in particular be only limited by diffraction, that is to say may have a width of an Airy disc.

A sample plane is a plane in the sample transverse or perpendicular to the optical axis, the said plane in particular being a focal plane of the illumination objective and, as such, being optically conjugate to intermediate image planes in the illumination and detection beam paths. The sensor surface of a camera may typically be situated in an intermediate image plane.

A spatial intensity distribution of the excitation light in the back focal plane of the illumination objective is related, in a manner known per se, to the spatial intensity distribution of the excitation light in the sample-side focal plane, that is to say the sample plane, by way of a Fourier transform.

The terms "first separation device" and "second separation device" mean the respective optical components used to bring about the spatial separation of the light.

The excitation light is electromagnetic radiation, in particular in the visible spectral range and adjoining ranges. The only demand placed on the contrast-providing principle by the present invention is that the sample emits emission light as a consequence of the irradiation by the excitation light. Typically, the emission light may be fluorescence light, which the sample, in particular the dye molecules present there, emits or emit as a consequence of the irradiation by the excitation light.

What can initially be considered to be a concept of the invention is that the spatial separation of the excitation light in the two independent coordinate directions is respectively brought about using separate components. Thereafter, a further concept of the invention is that the separation in the second coordinate direction is quantitatively variable and that the quantitative adjustment of the separation, that is to say in particular a spacing of the illumination spots in the pupil, can be implemented using the same device that also supplies the separation as such in the second coordinate direction.

An advantage of the invention can be considered to be that simplifications are achieved in comparison with the prior art, in which separate components are required, firstly, for the separation as such and, secondly, for the quantitative adjustment of the spacings of the illumination spots in the pupil.

As a rule, the two-dimensional illumination patterns in the present invention have different periodicities in the two independent linear coordinate directions. The invention has recognized that the computational outlay for calculating the reconstructed images is acceptable for such illumination patterns.

In principle, different physical operating principles, for example refraction, in part reflection, can be applied for the separation of the excitation light in the first coordinate direction. In a preferred exemplary embodiment of the apparatus according to the invention, the first separation device comprises a device that is based on the diffraction of light. By way of example, the first separation device may comprise a grating, in particular a one-dimensionally structured grating, or a spatial light modulator.

In principle, the presence of a first separation device, in which a single quantitative value for the split in the first coordinate direction is obtained, is sufficient for the implementation of the invention. To be more flexible in this respect, it is advantageous if a plurality of gratings, in particular a plurality of one-dimensionally structured gratings, are present for selective insertion into the illumination beam path as first separation device. By way of example, the gratings may be arranged in a linear slide or a turret for the selective insertion into the illumination beam path.

By way of example, a conventional diffraction grating with grating bars is a one-dimensionally structured grating.

In principle, the second separation device being adjustable within the meaning of quantitatively different values of the separation being able to be obtained in the second coordinate direction is sufficient for the implementation of the invention. In a preferred variant of the apparatus according to the invention, the second separation device is continuously adjustable. This means that the separation in the second coordinate direction can be adjusted continuously, that is to say without jumps, or in any case with very small increments in at least one value interval.

For the separation of the excitation light in the second coordinate direction, too, different physical operating principles, for example refraction, in part reflection, can be used as a matter of principle. In a preferred embodiment of the apparatus according to the invention, the second separation device comprises at least one device that is based on the diffraction of light.

The adjustability of the second separation device can be obtained in different ways. By way of example, a grating constant of the device that is based on the diffraction of light may be adjustable, for instance in the case of an SLM. In a preferred exemplary embodiment, the device that is based on the diffraction of light is pivotable in the illumination beam path in order to align diffracted light relative to the optical axis. To this end, a drive, for example, may be present, for instance a motor-driven drive or a piezo-drive, in particular a drive to be controlled by the control unit.

There is design flexibility as a matter of principle in view of the arrangement of the first and the second separation device in the illumination beam path. The second separation device for adjustably separating the excitation light in the second linear coordinate direction may be at least partially arranged upstream of the first separation device in the illumination beam path. As an alternative or at the same time, it is also possible that the second separation device for adjustably separating the excitation light in the second linear coordinate direction is at least partially arranged downstream of the first separation device in the illumination beam path.

Preferably, the second separation device comprises a grating, in particular a one-dimensionally structured and in particular pivotable grating.

In a further preferred configuration of the apparatus according to the invention, a two-dimensionally structured and pivotable grating is present, the latter being associated with the first separation device and the second separation device.

This two-dimensionally structured grating may be structured in a first and a second linear coordinate direction and may be pivotable about an axis parallel to the first coordinate direction. The functionality of the first separation device may be implemented by the structuring in the first coordinate direction and the separation function of the second separation device may be implemented by the structuring in the second coordinate direction. Like in the exemplary embodiment described above, the variability of the separation by the second separation device can be achieved by the pivotability of the two-dimensionally structured grating and by a variation of the incoming radiation angle of the light on the two-dimensionally structured grating, the said variation being brought about by a pivotable mirror for example.

An adjustable beam deflection element, in particular a pivotable mirror, can preferably be present upstream of the grating in the illumination beam path in order to vary an angle of incidence on the pivotable grating.

In view of the components of the diffracted light to be used there is freedom of choice as a matter of principle. However, light of lower orders of the diffraction preferably tends to be used on account of the generally higher intensity available. By way of example, the pivotable grating can be positioned relative to the optical axis of the illumination beam path and the excitation light incident on the grating can be oriented relative to the grating such that light of the zeroth order of diffraction and light of the first order of diffraction and/or of a higher order of diffraction is radiated into the back focal plane of the illumination objective. In the corresponding variant of the method according to the invention, excitation light of the zeroth order of diffraction and light of the first order of diffraction is used to irradiate the sample.

By way of example, this can be implemented if the pivotable grating is aligned at an angle $\varphi_g$ with respect to the optical axis, the angle being given by $$\cos(\varphi_g) = \frac{m\lambda}{2\sin(\varphi_T)\Lambda}$$

where $\lambda$ is the wavelength of the excitation light, $\varphi_T$ is the angle of the used diffracted light with respect to the optical axis, $\Lambda$ is the grating constant of the grating and m is the order of diffraction of the used light.

To suitably adjust the intensities of the excitation light in the individual illumination spots in the pupil plane, an attenuator, in particular an adjustable and/or spatially resolving attenuator, can be present in a pupil plane of the illumination beam path or in the vicinity of a pupil plane of the illumination beam path. In particular, this attenuator may be controllable by the control unit. If light of the zeroth order of diffraction is unwanted, it can be masked using such an attenuator.

However, the grating may also be manufactured so that the zeroth order of diffraction and the first order of diffraction have the desired relative intensity distributions, in particular the same intensities, from the outset.

Additionally, or especially as an alternative, the pivotable grating can be positioned relative to the optical axis of the illumination beam path and the excitation light incident on the grating can be oriented relative to the grating such that light of the first order of diffraction and light of the minus first order of diffraction is radiated into the back focal plane of the illumination objective. Optionally, the advantage obtainable in this case is that the used orders of diffraction have the same intensity from the outset. In the corresponding variant of the method according to the invention, excitation light of the first order of diffraction and light of the minus first order of diffraction is used to irradiate the sample.

This can be implemented if the excitation light is incident on the pivotable grating at an angle of incidence $\varphi$ given by:

$$\left|\sin^{-1}\left(\frac{\lambda}{\Lambda} - \sin(\varphi)\right) - \sin^{-1}\left(-\frac{\lambda}{\Lambda} - \sin(\varphi)\right)\right| = 2\varphi_T$$

where $\lambda$ is the wavelength of the excitation light, $\varphi_T$ is the angle of the used diffracted excitation light with respect to the optical axis and $\Lambda$ is the grating constant of the grating.

However, light of higher orders of diffraction can also be used as a matter of principle. In such variants, the pivotable grating is positioned relative to the optical axis of the illumination beam path and the excitation light incident on the grating is oriented relative to the grating such that the following applies at least to some of the light radiated into the back focal plane of the microscope objective: $|m|>1$, where m is the order of diffraction at the grating.

In the apparatus according to the invention and the methods according to the invention, the geometry of the grating and its illumination can be set such that the used orders of diffraction are symmetric about the optical axis.

The used orders of diffraction assume an angle with respect to the optical axis which, in the sample plane, corresponds to an angle of incidence greater than the angle for total internal reflection and, in particular, corresponds to a TIRF angle. This need not apply to the angle of incidence of the excitation light on the grating in relation to the optical axis. The angles of the utilized orders of diffraction are adjustable at least over a small range.

In further variants of the apparatus according to the invention, the second separation device comprises at least one beam splitter, in particular a neutral splitter. A variability of the separation can be achieved by virtue of the second separation device being linearly displaceable, in particular on the beam exit side and in particular in a direction parallel to the optical axis. By way of example, the second separation device may comprise a linearly displaceable coated wedge-shaped or prismatic component, in particular with an internal beam splitter.

What is important for the displacement device is that it sufficiently defines a displacement of the illumination pattern, that is to say for example allows this in sufficiently small increments and over a sufficient displacement travel, in each case in both linear coordinate directions perpendicular to the optical axis. In a preferred configuration of the apparatus according to the invention, the displacement device comprises at least one pivotable mirror, in particular a two-axis scanner mirror, or is formed by at least one pivotable mirror. Such pivotable mirrors can preferably be arranged in a pupil plane or in the vicinity of a pupil plane.

In principle, it is also possible that the displacement device comprises at least one micromirror array, in particular at least one controllable and/or programmable micromirror array, or is formed by at least one micromirror array, in particular at least one controllable and/or programmable micromirror array.

In a preferred exemplary embodiment, the displacement device is formed by a glass plate, in particular a galvanometrically biaxially displaceable glass plate. In general, the displacement device can advantageously be controlled by the control unit.

In principle, the polarization state of the excitation light is not decisive for the implementation of the apparatus according to the invention and the methods according to the invention. However, the modulation contrast and hence the ultimately attainable resolution may be increased by the use of polarized light. In a preferred embodiment of the apparatus according to the invention, a linearly polarizing filter for linearly polarizing the excitation light is present in the illumination beam path, in particular in an intermediate image plane or in the vicinity of an intermediate image plane. This allows the implementation of variants of the method according to the invention in which the excitation light is radiated on the sample in substantially linearly polarized fashion. Preferably, a linear polarization is set in the direction of the second linear coordinate direction, that is to say in the direction in which the spacing of the illumination spots in the pupils is adjustable and, in particular, at a maximum. What is known as azimuthal polarization is used in a further preferred configuration. In this case, the polarization is linearly everywhere as a matter of principle and the polarization vectors are each located on the coordinate lines of the azimuth angle, that is to say on annuli around the coordinate origin, that is to say around the optical axis.

In another embodiment of the apparatus according to the invention, a circularly polarizing filter for circularly polarizing the excitation light can be present in the illumination beam path, in particular in an intermediate image plane or in the vicinity of an intermediate image plane. This allows the implementation of variants of the method according to the invention in which the excitation light is radiated on the sample in substantially circularly polarized fashion.

In principle, the illumination objective and the microscope objective can be different objectives. By way of example, this would be the case if a sample were to be observed in transmitted light. However, the illumination objective and the microscope objective is one and the same objective in a particularly preferred embodiment variant of the apparatus according to the invention.

In a manner known per se, a main colour splitter may be present for separating components of the excitation light from the emission light. To be flexible in view of the use of excitation light with different wavelengths, a plurality of interchangeable main colour splitters for example may be present, the plurality of interchangeable main colour splitters being arranged in a linear slide or in a turret for the selective insertion into the illumination beam path and detection beam path.

A z-mover, in particular a motor driven z-mover, may be present for varying the distance between the sample and the illumination objective and/or the microscope objective. This z-mover may be controllable by the control unit.

An immersion medium, for example an immersion oil, may be present between the illumination objective and the sample in order to match the refractive indices.

A plurality of interchangeable tube lenses may be present in the detection beam path in order to vary a magnification of the image of the sample imaged on the camera. The interchangeable tube lenses may be arranged in a linear slide or a turret for the selective insertion into the detection beam path.

The control unit can be configured to control one or more of the following components, in particular in a manner adapted to one another in part or in full:
  adjustable beam deflection element, in particular mirror;
  second separation device, in particular pivotable grating;
  displacement device, in particular displaceable glass plate;
  spatially resolving attenuator;
  displacement device for varying a distance between the sample and the illumination objective and/or microscope objective;
  camera.

BRIEF DESCRIPTION OF THE DRAWINGS

Further advantages and features of the present invention are discussed below with reference to the attached figures, in which.

In general, identical and identically acting components are in each case identified by the same reference signs in the figures.

DETAILED DESCRIPTION OF THE INVENTIONS

A first exemplary embodiment of an apparatus according to the invention and variants of the method according to the invention rendered possible using this apparatus are explained in conjunction with FIGS. 1 to 7.

Figure 1:
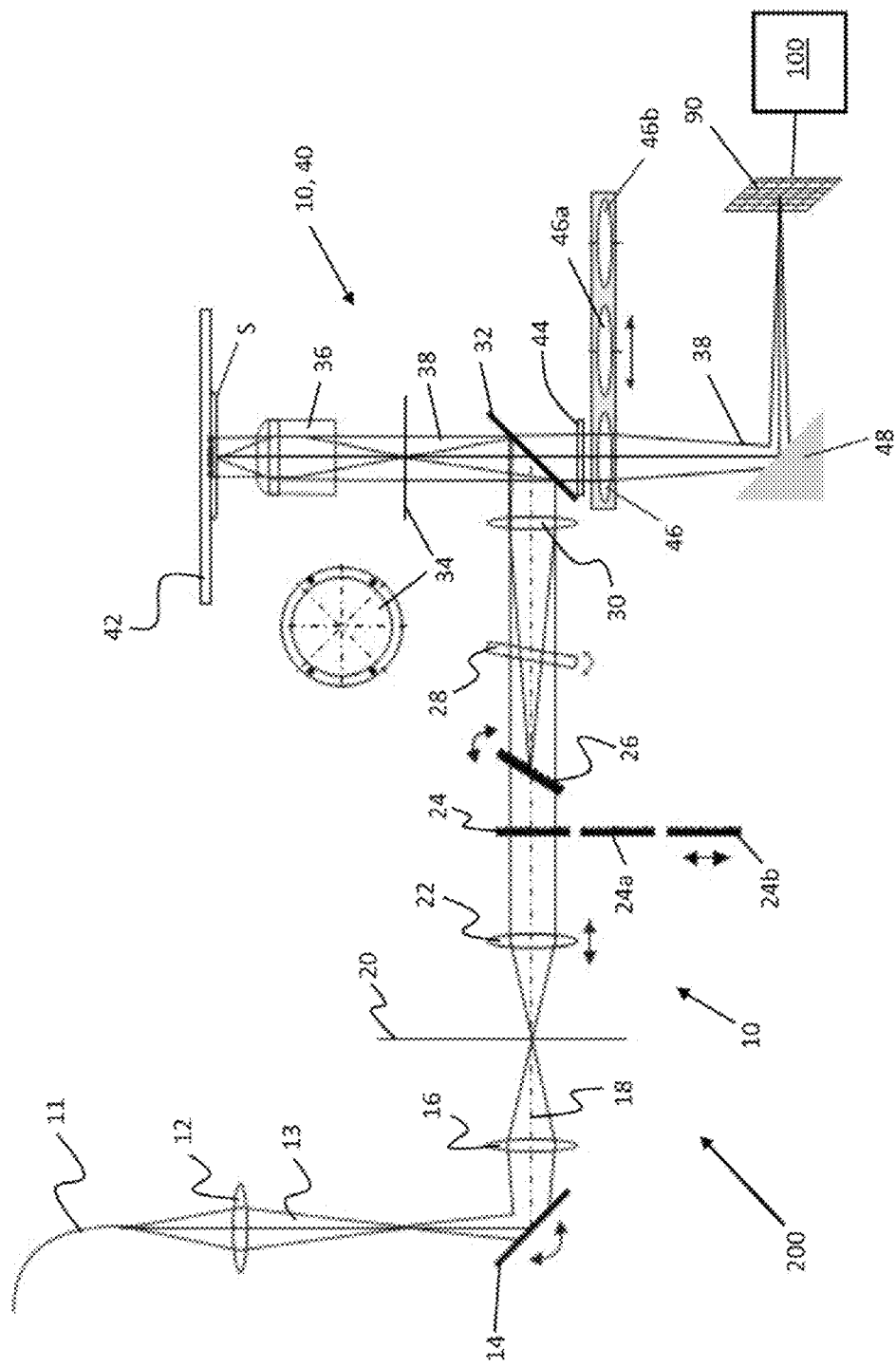
FIG. 1: shows a first exemplary embodiment of the apparatus according to the invention.

The apparatus 200 for structured illumination microscopy, depicted schematically in FIG. 1, initially comprises an illumination beam path 10 and a detection beam path 40. The illumination beam path 10 serves to irradiate a sample S with excitation light 13. The detection beam path 40 serves to guide emission light 38, which is emitted by the sample S as a consequence of the irradiation by the excitation light 13, to a camera 90. The camera 90 serves to record images of the sample S. A control unit 100, for example a PC, is present for calculating microscopic images of the sample S using partial images of the sample S recorded for different positions of the illumination pattern in the sample plane. In the example of FIG. 1, there is a sample holder 42 for holding the sample.

In detail, the excitation light 13 from a light source (not depicted here), for example a laser, reaches the pivotable mirror 14, which may also be referred to as a TIRF mirror, via an optical fibre 11 and a lens 12. An angle of the excitation light 13 relative to the optical axis 18 can be adjusted by means of the mirror 14. The excitation light 13 reaches the diffraction grating 24, which implements the first separation device in this exemplary embodiment, via further lenses 16 and 22, with a pupil plane 20 being formed between said further lenses. Further diffraction gratings 24a, 24b, which can be selectively introduced into the beam path via a linear slide, are present for the adaptation to various wavelengths. According to the invention, the diffraction grating 24 serves to separate the excitation light 13 in a first linear coordinate direction y in a pupil plane 34. To this end, the grating bars of the diffraction grating 24 run parallel to the plane of the drawing. Accordingly, the separation is implemented in a direction perpendicular to the plane of the drawing, and hence in the coordinate direction y in FIG. 6.

The excitation light 13 that has been separated in the first coordinate direction y (see FIG. 6) by the diffraction grating 24 thereupon reaches the diffraction grating 26 which, jointly with the pivotable mirror 14, implements the second separation device in the exemplary embodiment of FIG. 1. The mirror 14 and the diffraction grating 26 are both pivotable about an axis oriented perpendicular to the plane of the drawing. Now, the excitation light 13 has been separated in both linear coordinate directions x and y, that is to say it consists of four beams. Light of the zeroth order of diffraction has been blocked. These beams reach the back focal plane 34 of an illumination objective 34 via a tube lens 30 and the main colour splitter 32, and form four illumination points in the said back focal plane.

The illumination situation in the pupil plane 34 is depicted schematically in FIG. 1, below and to the left of the illumination objective 36. The pupil has the shape of an annulus. In this case, the outer annulus corresponds to angles in the plane of the sample S that are greater than the angle for total internal reflection. The four illumination points generated by a two-dimensional illumination pattern in the sample S are schematically depicted in this outer annulus. How the illumination points are generated in the pupil plane 34 using the apparatus 200 according to the invention is described below, in particular in conjunction with FIG. 6.

Then, the excitation light 13 is radiated on the sample S as a two-dimensional illumination pattern at angles greater than the angle for total internal reflection.

Figure 6:
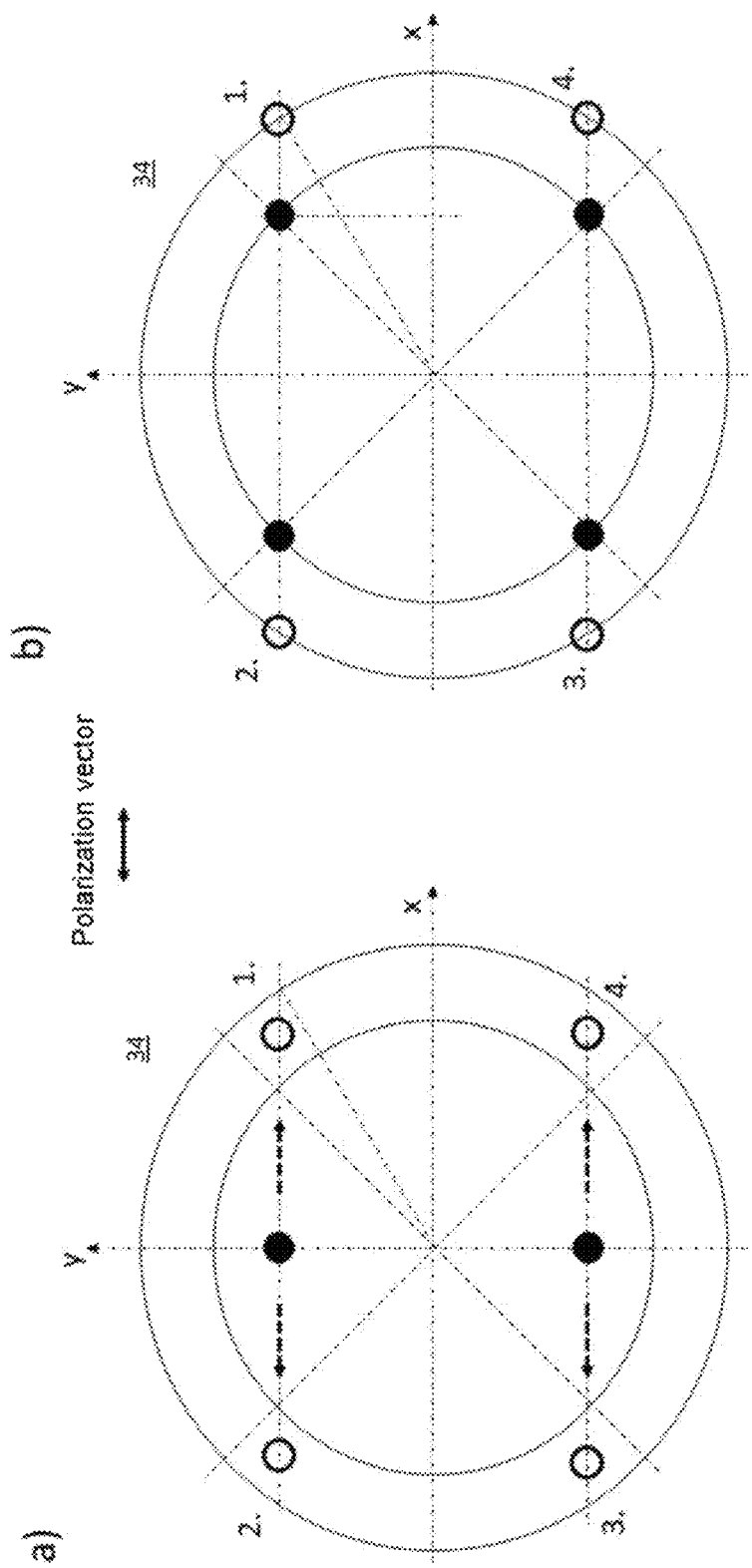
FIG. 6: is a schematic representation of the illumination situation in a pupil plane.
Figure 7:
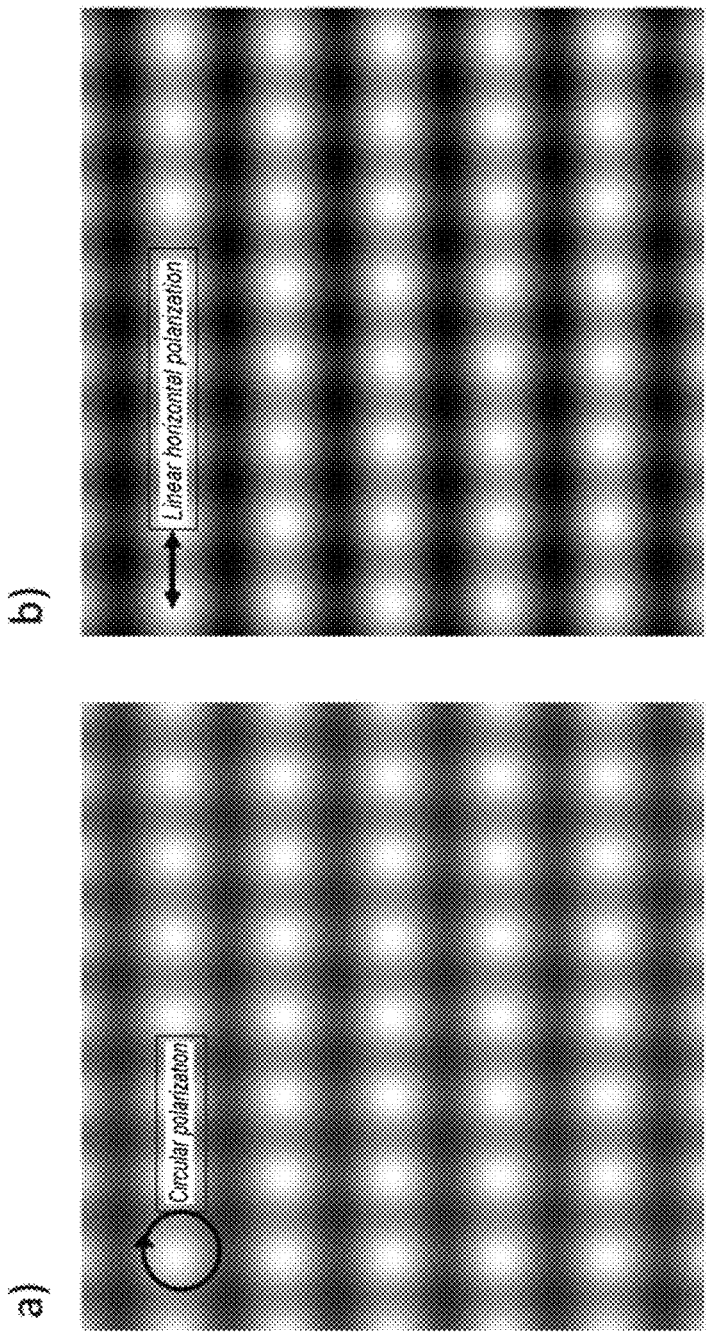
FIG. 7: shows representations of two-dimensional illumination patterns in the case of circular polarization of the excitation light (a) and in the case of linear horizontal polarization of the excitation light (b)

Two examples of a two-dimensional illumination pattern are depicted in FIG. 7. FIG. 7 a) shows an illumination pattern in which the excitation light 13 with circular polarization is radiated on the sample S. FIG. 7 b) shows an illumination pattern in which the excitation light 13 with linear horizontal polarization parallel to the x-direction (see FIG. 6) is radiated on the sample S. The modulation contrast is slightly better for the linear horizontal polarization. The polarization filters required for attaining the desired polarization are not depicted in FIG. 1. Advantageously, these are arranged in an intermediate image plane or in the vicinity of an intermediate image plane.

A displacement device, formed as a galvanometrically biaxially pivotable glass plate 28 in the exemplary embodiment depicted in FIG. 1, is present for laterally displacing the illumination pattern in the sample plane. The glass plate 28, which is arranged between the pivotable grating 26 and the tube lens 30 in an intermediate image plane or in the vicinity of an intermediate image plane, is pivotable about an axis oriented perpendicular to the plane of the drawing and moreover pivotable about an axis which lies in the plane of the drawing and is oriented perpendicular to the optical axis 18. By way of suitable pivoting of the glass plate 28 about these axes, it is possible to laterally displace the two-dimensional illumination pattern in both linear coordinate directions x, y in the sample plane. Such pivotable glass plates are also referred to as wobble plate phase shifters.

Typically, the illumination pattern is displaced to for example 3 to 5 positions per illumination pattern period, with the result that a microscopic image of the sample is calculated from a total of approximately 9 partial images.

According to the invention, an adjustable second separation device is present for variably separating the excitation light 13 in the pupil plane 34 in a second linear coordinate direction x which is independent of the first linear coordinate direction y. In the exemplary embodiment depicted in FIG. 1, the second separation device is formed from a pivotable mirror 14 and a likewise pivotable diffraction grating 26, the grating bars of which are oriented perpendicular to the plane of the drawing.

In the exemplary embodiment depicted in FIG. 1, the detection beam path 40 runs via the microscope objective 36, which is identical to the illumination objective, via the main colour splitter 32, which separates components of the excitation light 13 from emission light 38 emitted by the sample S as a consequence of the irradiation by the excitation light 13, via a further emission filter 44, via a tube lens 46 and via a mirror 48 to the camera 90. A plurality of different tube lenses 46, 46a, 46b, which can be selectively introduced into the detection beam path 40, are available in a linear slide for the purposes of varying the magnification.

The effect of the diffraction grating 24 and pivotable diffraction grating 26 is explained in more detail with reference to FIG. 6. FIGS. 6 a) and b) each show representations of the pupil plane 34. On account of the cylindrical symmetry of the illumination objective 36, the pupil has a circular shape, with the points in the depicted outer annuli corresponding to those points associated with illumination angles in the sample plane greater than the angle for total internal reflection. The situation without the diffraction grating 26 and without the pivotable diffraction grating 26 should be considered first. If the diffraction gratings 24 and 26 were not present and if the mirror 14 were moreover adjusted so that the excitation light 13 passes through the illumination beam path 10 at an angle of 0° relative to the optical axis 18, then the excitation light 13 would be focused at a point in the centre of the pupil plane 34 by the tube lens 30. As a result of the effect of the diffraction grating 24, there now is a split in the first linear coordinate direction y, that is to say vertically in FIG. 6. In the sketch of FIG. 6 a), this split is represented by the two black dots which are both located on the y-axis and consequently each have an x-coordinate of zero. As a result of the joint effect of the pivotable grating 26 and the pivotable mirror 14, there then is the split in the second linear coordinate direction x, with the result that, overall, there is a total of four illumination spots present in the outer ring of the pupil. The upper illumination spots on the y-axis thus become the illumination spots 1 and 2 and the lower illumination spots on the y-axis thus give rise accordingly to the illumination spots 3 and 4.

The sketch of FIG. 6 b) represents illumination spots with which an illumination angle less than the angle for total internal reflection can still be obtained. The angle for total internal reflection is just obtained in the case of the four black inner illumination spots. For the given split in the y-direction, the maximum period of the illumination pattern in the y-direction is obtained using this point pattern. For the given split in the y-direction, the minimum period of the illumination pattern in the y-direction is obtained using the four illumination spots (circles) located externally at the limit of the numerical aperture. Using the apparatus according to the invention, the illumination pattern can be adjusted between the extreme cases of the four black inner illumination spots (black points) and the four outer illumination spots (black circles). In this example, the polarization vector extends parallel to the x-direction in each case, and this is referred to as a linear horizontal polarization.

A first variant of the method according to the invention, in which light of the zeroth and the first order of diffraction is used, is explained with reference to FIGS. 2 and 3.

Figure 2:
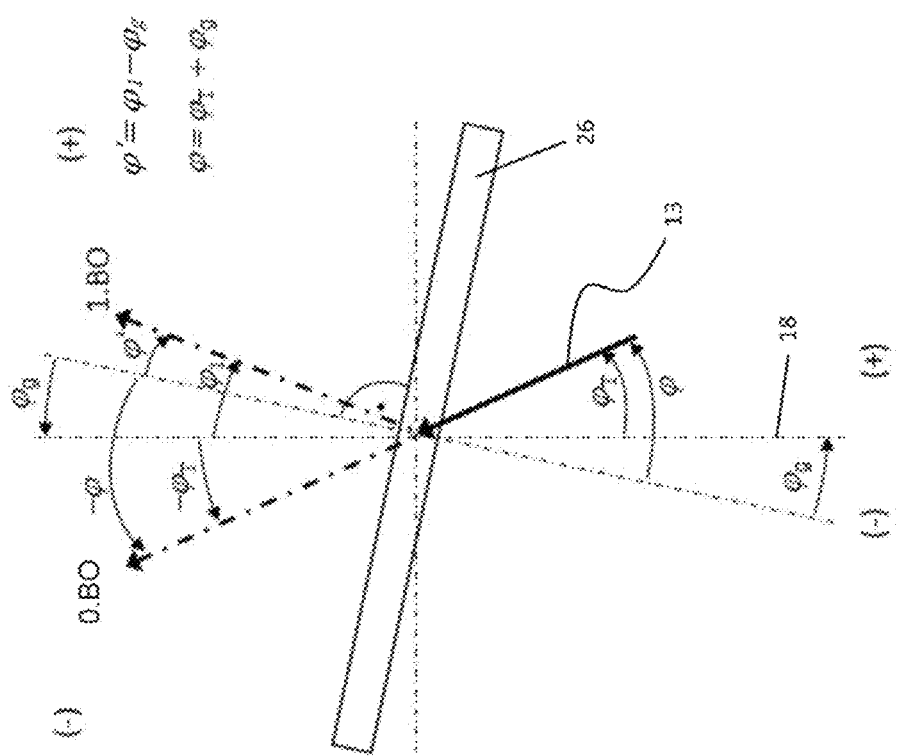
FIG. 2: is a diagram for explaining an exemplary embodiment of the second separation device and a first method variant.

FIG. 2 schematically shows the pivotable diffraction grating 26, which is tilted by an angle $\varphi_g$ relative to the optical axis 18 in the situation shown. The grating bars of the diffraction grating 26 extend perpendicular to the plane of the drawing. The angle $\varphi_g$ can be adjusted by pivoting the diffraction grating 26, optionally under the control of the control unit 100. The excitation light 13 is radiated on the diffraction grating 26 at an angle $\varphi$ relative to the surface normal thereof. This is:

$$\varphi = \varphi_g + \varphi_T$$

where $\varphi_T$ is the angle of the excitation light 13 relative to the optical axis 18, which angle can be varied by adjusting the mirror 14, optionally under the control of the control unit 100.

FIG. 2 also plots the rays of the zeroth order of diffraction 0.BO and the first order of refraction 1.BO. The ray of the zeroth order of diffraction 0.BO assumes an angle of $-\varphi_T$ relative to the optical axis 18 and an angle of $-\varphi$ relative to the surface normal of the diffraction grating 26. This follows from the angle of the excitation light 13 relative to the optical axis 18 and relative to the surface normal of the diffraction grating 26, respectively.

The ray of the first order of diffraction 1.BO assumes an angle $\varphi_1$ relative to the optical axis 18 and an angle $\varphi'$ relative to the surface normal of the diffraction grating 26. This is:

$$\varphi_1 = \varphi' - \varphi_g$$

So that, as desired, the illumination spots formed by the rays 0.BO and 1.BO are symmetric with respect to the y-axis in the back focal plane 34 of the microscope objective 36, the following must apply:

$$\varphi_1 = \varphi_T$$

Using the general grating equation $$\sin(\varphi') + \sin(\varphi) = \frac{m\lambda}{\Lambda}$$

the following follows according to the geometry of the imaging:

$$\sin(\varphi_1 - \varphi_g) + \sin(\varphi_T + \varphi_g) = \frac{m\lambda}{\Lambda}$$

where $\lambda$ is the wavelength of the excitation light 13, $\Lambda$ is the grating period of the diffraction grating 26 and m is the order of diffraction.

Using $\varphi_1 = \varphi_T$, the following follows:

$$2 \times \sin\varphi_T \cos\varphi_g = \frac{m\lambda}{\Lambda}$$

and this can be rewritten as:

$$\cos(\varphi_g) = \frac{m\lambda}{2\sin(\varphi_T)\Lambda}$$

which represents a type of Bragg condition.

A position of the illumination spots in the back focal plane 34 of the microscope objective 36 follows from a desired period of the illumination pattern and the corresponding angle $\varphi_T$ in turn arises from the said position. Using the grating period $\Lambda$ as a parameter, it is possible to calculate $\varphi_g$ using $$\cos(\varphi_g) = \frac{m\lambda}{2\sin(\varphi_T)\Lambda}$$

In the process, $\Lambda$ can be varied until an optimal range for $\varphi_g$ has been found.

Figure 3:
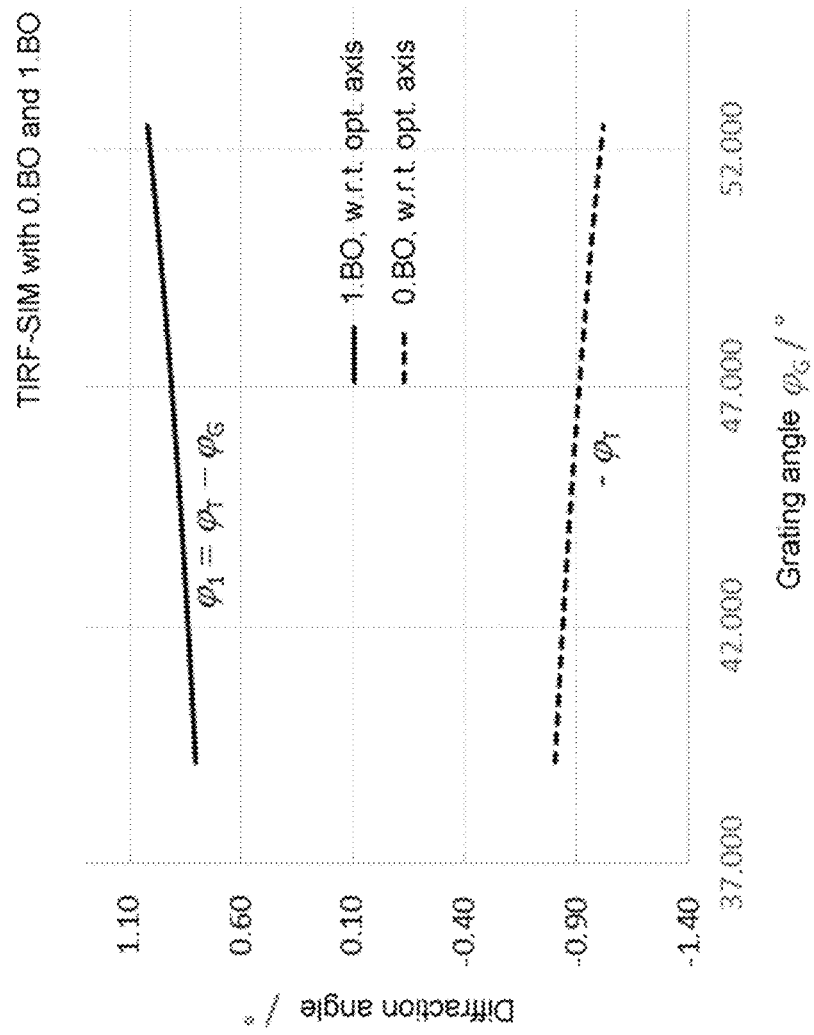
FIG. 3: is a diagram for further explaining the method variant described in conjunction with FIG. 2.
Figure 4:
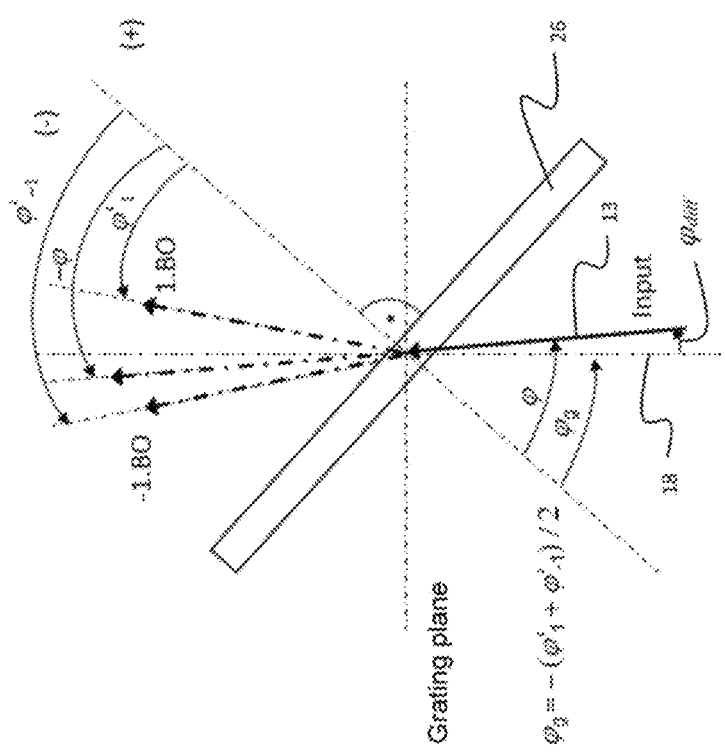
FIG. 4: is a diagram for explaining a second method variant using the separation device shown in FIG. 2.

In the diagram of FIG. 3, the angle $-\varphi_T$ of the ray of the zeroth order of diffraction 0.BO (dashed curve) and the angle $\varphi_1$ of the ray of the first order of diffraction 1.BO (solid curve) are plotted on the vertical axis against the grating angle $\varphi_g$ on the horizontal axis for a given angular range for $\varphi_T$ for the "alpha PLAN Apo 63x/1.46 Oil" objective. For the example shown, $\Lambda=22.5$ µm and $\lambda=488$ nm. It is evident that the diffraction angles are in the range of those angles that are smaller than the angle for total internal reflection.

In the example, the grating angle $\varphi_g$ varies slightly more than 10° when $\varphi_T$ is varied. Depending on the design of the diffraction grating 26, it is possible to compensate the intensity ratio between the zeroth and the first order of diffraction, for example by an attenuator near the pupil.

However, what generally applies is that it is also possible to use, from the outset, diffraction gratings that supply the desired intensity ratio of the utilized orders of diffraction. In the example, the same intensities of the zeroth and the first order of diffraction would be desirable, and this can be achieved by way of a suitable design of the diffraction grating 26.

In a second variant of the method according to the invention, use is made of light of the first and the −1st orders of diffraction for the generation of the two-dimensional illumination pattern. This is described with reference to FIGS. 4 and 5.

FIG. 4 shows, once again, the pivotable diffraction grating 26 and the excitation light 13 incident thereon. The diffraction grating 26 is tilted by an angle $\varphi_g$ relative to the optical axis 18. The excitation light 13 is incident on the diffraction grating 26 at an angle $\varphi$ relative to the surface normal of the said diffraction grating 26. Also represented are the rays of the first order of diffraction 1.BO and of the minus first order of diffraction −1.BO emerging from the diffraction grating 26, and the ray of the zeroth order of diffraction. In the situation represented by FIG. 4, the diffraction grating the 26 and the direction of the excitation light 13 have already been rotated so that the rays of the first order of diffraction 1.BO and the minus first order of diffraction −1.BO are symmetrical with respect to the optical axis 18. The ray of the first order of diffraction 1.BO is at an angle of $\varphi'_1$ relative to the surface normal of the diffraction grating 26. The ray of the minus first order of diffraction −1.BO is at an angle of $\varphi'_{-1}$ relative to the surface normal of the diffraction grating 26. The ray of the zeroth order of diffraction is at an angle of $-\varphi$ relative to the surface normal of the diffraction grating 26.

The angle $\varphi_g$ must be determined with the given parameters of the diffraction grating 26 so that the following applies to the difference in the diffraction angles between the first and the minus first order of diffraction:

$$\varphi'_{-1} - \varphi'_1 = 2\varphi_T$$

where $\varphi_T$ once again is the angle which the utilized orders of diffraction must assume relative to the optical axis 18 in order to generate illumination spots at the desired positions in the back focal plane 34 of the microscope objective 36.

The diffraction grating 26 and the direction of the excitation light 13 have to be rotated so that the centre between the rays of the first order of diffraction 1.BO and the minus first order of diffraction −1.BO coincides with the optical axis 18. Thus, the following must apply:

$$(\varphi'_{-1} + \varphi'_1)/2 = -\varphi_g$$

The angle $\varphi_{diff}$ of the excitation light 13 relative to the optical axis 18 arises from the difference between the angle of incidence $\varphi$ and the centre angle $(\varphi'_{-1} + \varphi'_1)/2$.

Since $\varphi_{diff}$ is small, the diffraction grating 26 is twisted more or less by the centre angle $(\varphi'_{-1} + \varphi'_1)/2$ or the angle of incidence $\varphi$ with respect to the optical axis 18.

The following procedure can be carried out in order to determine the optimal angle settings of the diffraction grating 26:

1. The angle $\varphi_T$ is specified; see above.
2. The angle of incidence $\varphi$ is varied.
3. For each $\varphi$, the diffraction angles $\varphi'_1$ and $\varphi'_{-1}$ are calculated according to the grating equation, with the wavelength $\lambda$ and grating period $\Lambda$ as parameters.

4. The difference ($\varphi'_{-1} - \varphi'_1$) is calculated and compared to the target value $2\varphi_T$. Once correspondence has been obtained, the suitable $\varphi$ has been determined.
5. In this case, $\Lambda$ can be set so that the variation range of $\varphi$ is as small as possible for the tuning range of $\varphi_T$, $\Lambda_{min}$ is given in this case by $\lambda/\sin(\varphi_{T,min})$.

This corresponds to determining $\varphi$ using the equation:

$$\left|\sin^{-1}\left(\frac{\lambda}{\Lambda} - \sin(\varphi)\right) - \sin^{-1}\left(-\frac{\lambda}{\Lambda} - \sin(\varphi)\right)\right| = 2\varphi_T$$

Solving this equation for $\varphi$ is reduced to finding zeros of a polynomial using the addition theorem of the arcsine function.

Figure 5:
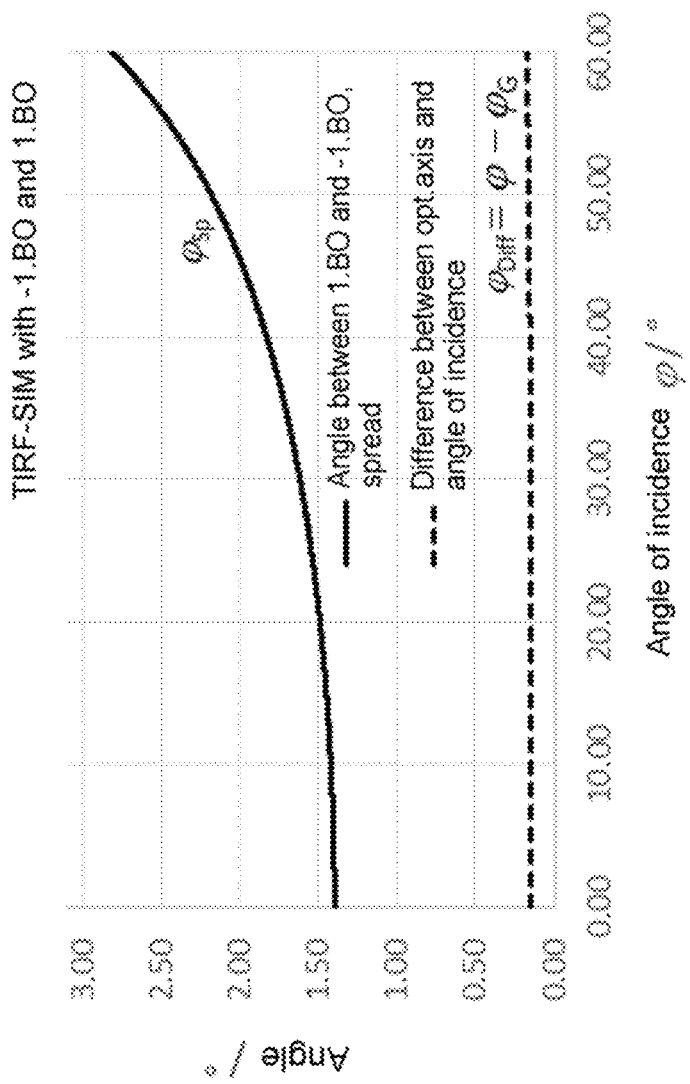
FIG. 5: is a diagram for further explaining the method variant described in conjunction with FIG. 4.

FIG. 5 shows a diagram in which the angle ($\varphi'_{-1} - \varphi'_1$) between the rays of the first order of diffraction 1.BO and minus first order of diffraction −1.BO and the angle $\varphi_{diff}$ between the angle of incidence of the excitation light 13 and the optical axis 18 have been plotted against the angle of incidence $\varphi$ of the excitation light 13 in relation to the surface normal of the diffraction grating 26, for the "alpha-Plan-Apo 63x/1.46 Oil" objective, $\lambda$=488 nm and $\Lambda$=40 µm.

As is evident, the angle ($\varphi'_{-1} - \varphi'_1$) between the rays of the first order of diffraction 1.BO and the minus first order of diffraction −1.BO is of the order of $2\varphi_T$, as desired.

Since a method for realizing a variable distance setting between the illumination spots in the objective pupil in the x-direction (see FIG. 6) for the TIRF mode has been selected, it is necessary to consider that an illumination structured in two dimensions requires that for example four illumination spots can be displaced into the outer ring (see FIG. 6) in the back focal plane 34 of the microscope objective 36.

To simplify the structure, the four illumination spots in the back focal plane 34 of the microscope objective 36 are modifiable in terms of distance only in horizontal fashion, that is to say in the x-direction, in the variants explained here, as explained in FIG. 6. The split in the y-direction is specified by the utilized grating 24. This has as a consequence that the modulation frequencies of the structured illumination at the location of the sample S may differ slightly in the x- and y-direction. However, this only has a marginal influence on the lateral resolution.

Examples for adjusting the four illumination spots with the option of adjusting the horizontal position of the illumination spots, and consequently the split in the x-direction, are shown in FIG. 6.

The illumination intensity in the sample plane is also influenced by the polarization of the illumination spots (FIG. 7). The linear horizontal, linear vertical and circular polarization states are simple to produce. For these polarization states, simulations have yielded that the modulation contrast in the x/y-direction is best for the linear horizontal polarization, that is to say in the x-direction, in which the distance between the illumination spots is also adjustable. Specifically, the simulations supplied the following values for the x/y-modulation contrast: linear horizontal polarization: 23%/72%; circular polarization: 25%/51%. Advantageously, an azimuthal polarization can also be used. In this case, the polarization is linearly everywhere as a matter of principle and the polarization vectors are each located on the coordinate lines of the azimuth angle, that is to say on annuli around the coordinate origin.

A second exemplary embodiment of an apparatus 300 according to the invention is explained with reference to FIG. 8. Described here are only the most important differences in comparison with the first exemplary embodiment in FIG. 1, which are mainly found in the region of the illumination beam path 10 upstream of the main beam splitter 32.

The excitation light 13 reaches the diffraction grating 25, by means of which the first separation device is implemented in this exemplary embodiment, via an optical fibre 11, a lens 12 and a half-wave plate 15. The excitation light 13 is separated by the diffraction grating 25 in a direction perpendicular to the plane of the drawing, that is to say in the first linear coordinate direction y. The excitation light 13 that has been split in the direction perpendicular to the plane of the drawing reaches a linearly displaceable coated wedge 70, by means of which the second separation device is implemented in the exemplary embodiment of FIG. 8, via a further lens 27. The wedge 70 may also be referred to as a prism, double prism or beam splitter double prism. The light beams of the separated excitation light 13 enter the wedge 70 virtually perpendicularly and virtually completely and are then separated with substantially symmetric intensity distribution in the centre of the said wedge at a 50:50 beam splitter, as indicated by the arrows 74. The split can be adjusted quantitatively by way of a linear displacement of the wedge 70 in the direction of the arrows 72. The split in the direction of the arrows 74 increases with a displacement of the wedge 70 the left and, accordingly, it reduces with a displacement of the wedge 70 to the right. The light beams of the excitation light 13 split thus then reach the main beam splitter 32 via a further lens 27, the pivotable glass plate 28 and the tube lens 30, and, from the said main beam splitter, they reach the back focal plane of the microscope objective 36. Optionally, illumination light for wide-field microscopy can additionally be input coupled here via a mirror prism 29.

A third exemplary embodiment of an apparatus 400 according to the invention is explained with reference to FIG. 9. Explained here are only the important differences in comparison with the third exemplary embodiment in FIG. 8, which are mainly found in the region of the illumination beam path 10 upstream of the displaceable wedge 70.

Figure 8:
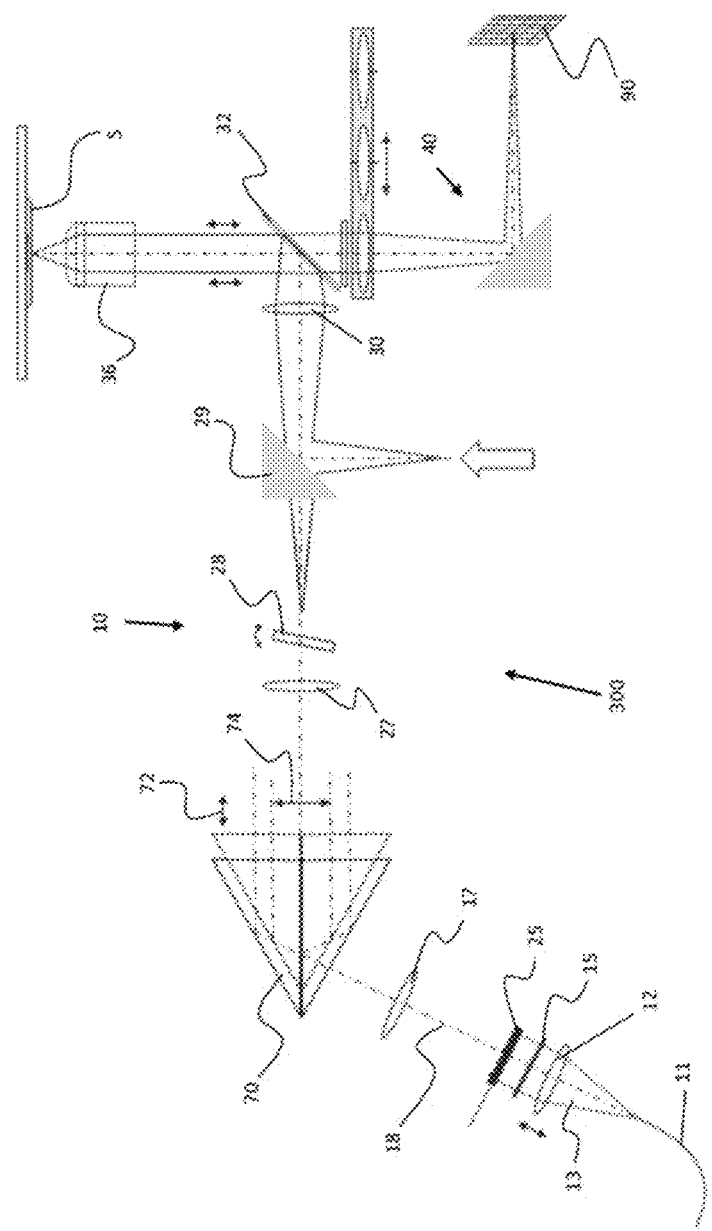
FIG. 8: shows a second exemplary embodiment of the apparatus according to the invention
Figure 9:
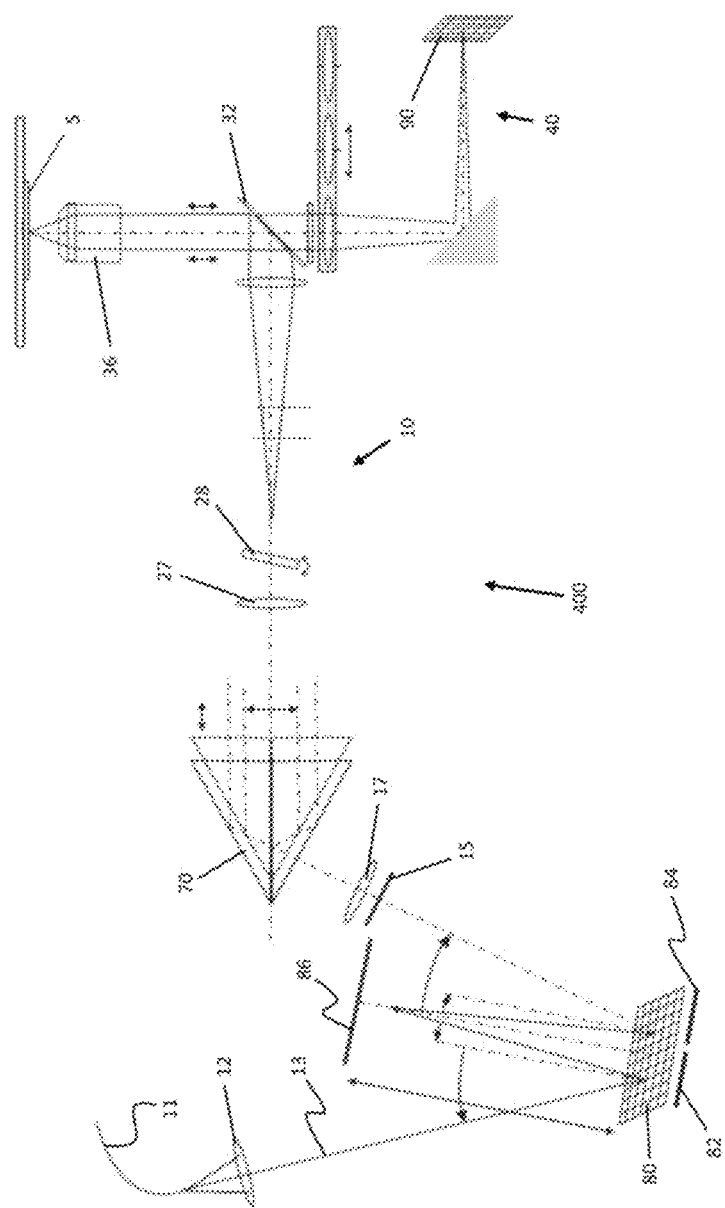
FIG. 9: shows a third exemplary embodiment of the apparatus according to the invention.

The important difference of the exemplary embodiment in FIG. 9 in comparison with FIG. 8 is that the first separation device is implemented by a spatial light modulator 80. Specifically, the excitation light 13 reaches a first portion 82 of the spatial light modulator 80, which is located in, or in any case in the vicinity of, a pupil plane of the illumination beam path 10. In the first portion 82, the spatial light modulator 80 is substantially controlled in such a way that a lens function (Fourier transform) is implemented. The excitation light 13 manipulated thus then reaches a mirror 86 and is reflected back by the latter onto a second portion 84 of the spatial light modulator 80, which is located in, or in any case in the vicinity of, an intermediate image plane of the illumination beam path 10. The first separation device is implemented by this second portion 84 of the spatial light modulator 80 in the exemplary embodiment in FIG. 9, that is to say the excitation light 13 is separated in the direction perpendicular to the plane of the drawing, and consequently in the first linear coordinate direction y. The mirror 86 may also be a spherical concave mirror, with the lens function in the portion 82 of the spatial light modulator 80 not being required in this case. The beams of the excitation light 13 that has been separated in the direction perpendicular to the plane of the drawing are then incident again on the linearly displaceable wedge 70 via a half-wave plate and a lens 17, the variable separation in the second linear coordinate direction then being implemented by means of the said linearly displaceable wedge, like in the exemplary embodiment in FIG. 8.

The present invention describes an alternative approach for the variable positioning of illumination spots of the excitation light in a pupil plane.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

10 Illumination beam path
11 Optical fibre
12 Lens
13 Excitation light
14 Pivotable mirror, TIRF mirror, part of the second separation device
15 Half-wave plate
16 Lens
17 Lens, tube lens
18 Optical axis
20 Pupil plane
22 Lens, collimator lens
24 Diffraction grating, in particular in or near the intermediate image plane, in particular on the linear slide, first separation device
24a Diffraction grating, alternative to diffraction grating 24, in particular on the linear slide
24b Diffraction grating, alternative to diffraction grating 24, in particular on the linear slide
25 Diffraction grating, first separation device
26 Pivotable diffraction grating, part of the second separation device
27 Lens
28 Pivotable glass plate, wobble plate phase shifter, displacement device
29 Mirror prism
30 Tube lens in the illumination beam path
32 Main beam splitter, in particular in the reflector turret
34 Back focal plane of the microscope objective 36, pupil plane
36 Illumination objective, microscope objective
38 Emission light
40 Detection beam path
42 Sample holder, sample stage
44 Emission filter
46 Tube lens in the detection beam path 40, in particular on the linear slide
46a Tube lens in the detection beam path 40, alternative to tube lens 46, in particular on the linear slide
46b Tube lens in the detection beam path 40, alternative to tube lens 46, in particular on the linear slide
48 Mirror
70 Displaceable coated wedge, prism, double prism, beam splitter double prism
72 Displacement direction
74 Distance between the separated rays, which is adjustable by displacement
80 Spatial light modulator (SLM)
82 First part of the spatial light modulator 80, in particular in or near the pupil plane.
84 Second part of the spatial light modulator 80, in particular in or near the intermediate image plane.
86 Mirror, plane or spherical concave mirror
90 Camera, for example an sCMOS camera
100 Control unit, for example PC
200 Microscope according to the invention
300 Microscope according to the invention
400 Microscope according to the invention
S Sample

The invention claimed is:

1. Apparatus for structured illumination microscopy, comprising
an illumination beam path for irradiating a sample with excitation light with a two-dimensional illumination pattern at angles greater than the angle for total internal reflection, the illumination beam path at least containing an illumination objective used to irradiate the sample,
a first separation device for separating the excitation light in a first linear coordinate direction in a pupil plane and
a displacement device for laterally displacing the illumination pattern in a sample plane,
having a detection beam path containing at least one microscope objective for guiding emission light to a camera, said emission light being emitted by the sample as a consequence of the irradiation by the excitation light,
a camera for recording images of the sample,
a control unit for calculating microscopic images of the sample (S) using partial images of the sample recorded for different positions of the illumination pattern in the sample plane, and
an adjustable second separation device for variably separating the excitation light in a second linear coordinate direction which is independent of the first linear coordinate direction, variable separation of the excitation light in said second linear coordinate direction being independent of the separation in the first linear coordinate direction in a pupil plane.

2. Apparatus according to claim 1,
wherein said first separation device comprises a device that is based on the diffraction of light.

3. Apparatus according to claim 1,
wherein said first separation device comprises a one-dimensionally structured grating or a spatial light modulator.

4. Apparatus according to claim 1,
further comprising a plurality of one-dimensionally structured gratings, for selective insertion into the illumination beam path as first separation device.

5. Apparatus according to claim 1,
wherein said second separation device is continuously adjustable.

6. Apparatus according to claim 1, wherein said second separation device comprises at least one pivotable device that is based on the diffraction of light.

7. Apparatus according to claim 6,
wherein said device that is based on the diffraction of light is pivotable in the illumination beam path in order to align diffracted light relative to the optical axis.

8. Apparatus according to claim 6,
wherein said second separation device comprises a one-dimensionally structured and pivotable grating.

9. Apparatus according to claim 1, further comprising a two-dimensionally structured and pivotable grating being associated with the first separation device and the second separation device.

10. Apparatus according to claim 6, further comprising a pivotable mirror upstream of the grating in the illumination beam path in order to vary an angle of incidence on the pivotable grating.

11. Apparatus according to claim 6, further comprising a pivotable grating positioned relative to the optical axis of the illumination beam path and the excitation light incident on the grating oriented relative to the grating such that light of the zeroth order of diffraction and light of the first order of diffraction and/or of a higher order of diffraction is radiated into the back focal plane of the illumination objective.

12. Apparatus according to claim 11,
wherein the pivotable grating is inclined at an angle $\varphi_g$ with respect to the optical axis, the angle being given by:

$$\cos(\varphi_g) = \frac{m\lambda}{2\sin(\varphi_T)\Lambda}$$

where $\lambda$ is the wavelength of the excitation light, $\varphi_T$ is the angle of the used diffracted light with respect to the optical axis (18), $\Lambda$ is the grating constant of the grating and m is the order of diffraction of the used light.

13. Apparatus according to claim 6, wherein the pivotable grating is positioned relative to the optical axis of the illumination beam path and the excitation light incident on the grating is oriented relative to the grating such that light of the first order of diffraction and light of the minus first order of diffraction is radiated into the back focal plane of the illumination objective.

14. Apparatus according to claim 13,
wherein the excitation light is incident on the pivotable grating at an angle of incidence $\varphi$ given by:

$$\left|\sin^{-1}\left(\frac{\lambda}{\Lambda} - \sin(\varphi)\right) - \sin^{-1}\left(-\frac{\lambda}{\Lambda} - \sin(\varphi)\right)\right| = 2\varphi_T$$

where $\lambda$ is the wavelength of the excitation light, $\varphi_T$ is the angle of the used diffracted excitation light with respect to the optical axis and $\Lambda$ is the grating constant of the grating.

15. Apparatus according to claim 6, wherein the pivotable grating is positioned relative to the optical axis of the illumination beam path and the excitation light incident on the grating is oriented relative to the grating such that the following applies at least to some of the light radiated into the back focal plane of the microscope objective: |m|>1, where m is the order of diffraction at the grating.

16. Apparatus according to claim 1, wherein the second separation device comprises at least one beam splitter, in particular a neutral splitter.

17. Apparatus according to claim 1, wherein the second separation device is linearly displaceable in a direction parallel to the optical axis.

18. Apparatus according to claim 1, wherein the second separation device comprises a linearly displaceable coated wedge-shaped component (70).

19. Apparatus according to claim 1, wherein the displacement device comprises at least one pivotable two-axis scanner mirror, or is formed by at least one pivotable mirror.

20. Apparatus according to claim 1, wherein the displacement device comprises at least one controllable and/or programmable micromirror array, or is formed by at least one controllable and/or programmable micromirror array.

21. Apparatus according to claim 1, wherein the displacement device is formed by a galvanometrically biaxially displaceable glass plate.

22. Apparatus according to claim 1, further comprising an adjustable and/or spatially resolving attenuator in a pupil plane of the illumination beam path or in the vicinity of a pupil plane of the illumination beam path.

23. Apparatus according to claim 1, wherein the illumination objective and the microscope objective are one and the same objective.

24. Apparatus according to claim 1, further comprising a main colour splitter for separating components of the excitation light from the emission light.

25. Apparatus according to claim 1, further comprising a control unit configured to control one or more of the following components in a manner adapted to one another:
the adjustable beam deflection element;
the second separation device;
the displacement device;
the spatially resolving attenuator;
the displacement device for varying a distance between the sample and the illumination objective and/or the microscope objective;
the camera.

26. Method for illuminating a sample for structured illumination microscopy,
comprising irradiating a sample by excitation light with a two-dimensional illumination pattern via an illumination objective using an illumination beam path at angles greater than an angle for total internal reflection, the excitation light (13) being radiated into separate illumination points in a pupil plane of the illumination beam path in order to provide the illumination pattern, and
separating excitation light being separated in a first linear coordinate direction in the pupil plane of the illumination beam path, and
variably separating the excitation light in a second linear coordinate direction which is independent of the first linear coordinate direction in order to form the illumination points with an illumination angle for total internal reflection, variable separation resulting from said variably separating the excitation light in a second linear coordinate direction being independent of the separation in the first linear coordinate direction.

27. Method according to claim 26,
wherein excitation light of the zeroth order of diffraction and light of the first order of diffraction is used to irradiate the sample.

28. Method according to claim 26,
wherein excitation light of the first order of diffraction and sample (S).

29. Method according to claim 26, wherein the excitation light is radiated onto the sample in linearly polarized fashion.

30. Method according to claim 26 wherein the excitation light is radiated onto the sample in a circularly polarized fashion.

31. Method of structured illumination microscopy, comprising irradiating a sample in structured fashion according to claim 26 using excitation light, guiding the emission light emitted by the sample as a consequence of being irradiated by the excitation light to a camera in a detection beam path containing at least one microscope objective,
laterally displacing the illumination pattern in a sample plane,
wherein recording a respective partial image of the sample for different positions of the illumination pattern in the sample plane and
calculating a microscopic image of the sample from the partial images of the sample.

32. Method according to claim 31,
wherein the emission light is fluorescence light.

\* \* \* \* \*